June 30, 1931.  M. D. JEFFRIES  1,812,440
HOLDER FOR CONTAINERS
Filed April 15, 1930
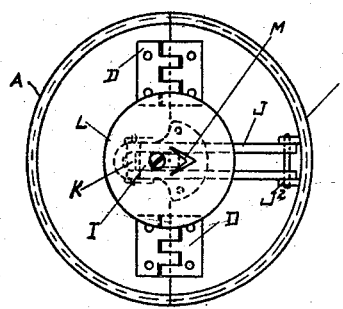
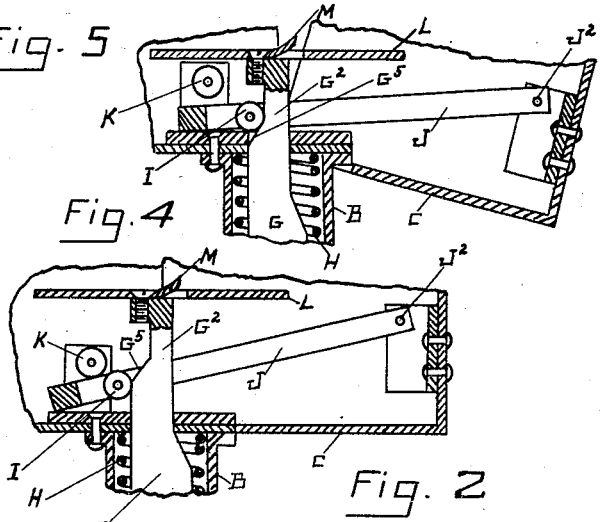
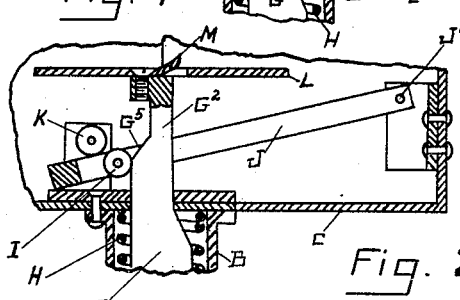
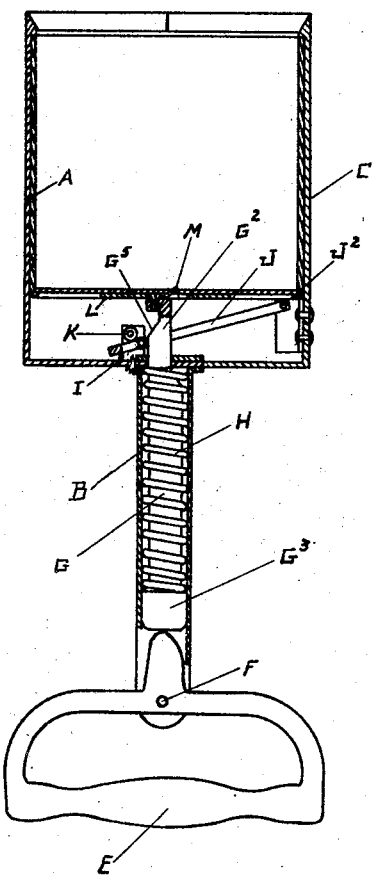
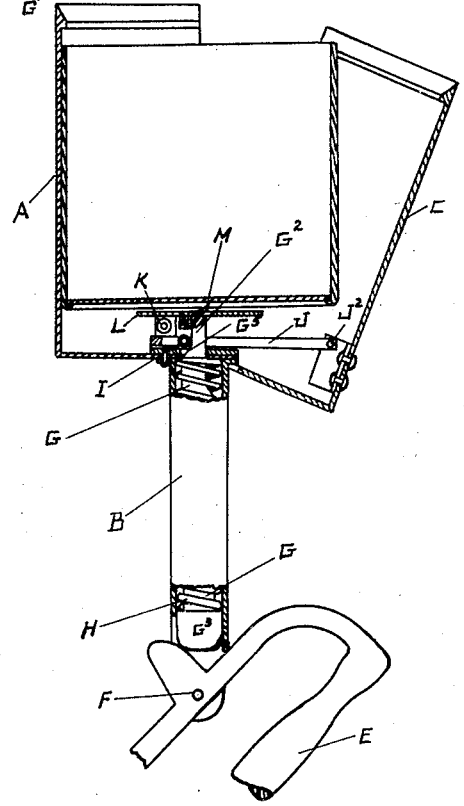
Mack D. Jeffries Inventor
By ............... Attorney Patented June 30, 1931

1,812,440

UNITED STATES PATENT OFFICE

MACK D. JEFFRIES, OF BOSTON, MASSACHUSETTS

HOLDER FOR CONTAINERS

Application filed April 15, 1930. Serial No. 444,419.

This invention relates to holders for containers such as are ordinarily used in the retailing of ice cream, and for holding such containers while they are being filled.

It has for its purposes to provide a more sanitary filling device than has been heretofore available; to eliminate the exposure of the working parts; to minimize the number of essential parts; to provide an improved and more effective cutting edge expanded to a width conforming to the thickness of the walls of the container used; to minimize the required operating force; to provide vent making means designed to function for the release of air pressure within the container during the filling process; to provide means for making a self sealing vent in the container used; to eliminate springs within the interior of the holder; to provide operating means by direct pressure of the working parts; to provide an improved combination adjusting plate designed to function as a cover for the working parts, to position the container properly for the filling operation, and to act as a carrier for the vent making means; to reduce production costs; and to provide the various other advantages and results made evident from the following specification.

I accomplish the purposes of the invention first from the sanitary standpoint, by enclosing the working mechanism within a closed case so as to exclude dust and foreign substances therefrom, and providing a smooth and unobstructed exterior surface, secondly by combining with a box holding receptacle with an improved cutting edge, a container adjusting plate designed also to function as a cover for the working parts and to act as a carrier for the vent making means, said container adaptable to open for the purpose of receiving the container and to close over and about the same, said vent making means comprising a cutting edge extending from said adjusting plate and adaptable to press against and pierce the bottom of the container as the adjusting plate by action of the handle mechanism is pressed against the bottom of the container.

Referring to the accompanying drawings which form a part of this specification, and in which similar letters of reference refer to similar parts throughout the various views, Figure 1 shows a side view of my device in closed position with a container held therein. Figure 2 shows the device in open position. Figure 3 is a view looking into the holder end of the device. Figure 4 shows an enlarged view of the working mechanism when the container holder is in closed position. Figure 5 shows an enlarged view of the mechanism in open position.

Referring again to the figures, A shows the section of the container receptacle which is fixed to the hollow handle rod B. C shows that section of the receptacle hinged at D so as to be movable to open and closed positions. E shows the handle, hinged at F on the rod B to the end that changing the position of the handle from that shown in Figure 2 to the position shown in Figure 1 projects the end $G^2$ of slidable member G into the interior of the container receptacle. When the handle E is returned to the position shown in Figure 2, the slidable member G is withdrawn from the receptacle by action of the spring H which exerts its pressure against the head $G^3$. The slidable member G is provided with a cam path $G^5$ against and on which the rollers I run during the movement of the link J (connected with the movable section C at $J^2$) which movement when toward the position shown in Figure 1 closes the receptacle, and when toward the position shown in Figure 2, opens the receptacle. The roller K acts as a means for easing the movement of the link J and keeps it in position over the end $G^2$ of the slidable member G. L shows the plate or follower attached to the end $G^2$ of the member G. M shows a cutting tool carried on the follower L designed to pierce the bottom of a container within the receptacle in closed position.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention, I claim as new and desire to secure by Letters Patent of the United States of America:—

1. A device of the character described, comprising a container holding receptacle having a cutting edge adapted to be forced into plastic material, said receptacle being composed of a pair of sections, one of which is movable to open and closed positions with respect to the other, a handle on the other section, a member slidably carried within said handle and provided with a cam surface thereon, a link pivotally connected with said movable section and a pair of circular members positioned adjacent said link and said slidable member to effect a cam action on said link whereby said sections are forced into engagement with each other.

2. A device of the character described, comprising a container holding receptacle having a cutting edge adapted to be forced into plastic material, said receptacle being composed of a pair of sections, one of which is movable to open and closed positions with respect to the other, a handle on the other section, a member slidably carried with said handle and provided with a cam surface thereon, a plate mounted at the end of said slidable member within said receptacle, a cutting tool carried on said plate adaptable to pierce the bottom of a container when within said receptacle, a link pivotally connected with said movable section, and a pair of cam members positioned adjacent said link and said slidable member to effect a cam action on said link whereby said sections are forced into engagement with each other.

In testimony whereof I affix my signature.

MACK D. JEFFRIES.